US007889068B2

(12) United States Patent
Connell, II et al.

(10) Patent No.: US 7,889,068 B2
(45) Date of Patent: Feb. 15, 2011

(54) ALARM SOLUTION FOR SECURING SHOPPING CHECKOUT

(75) Inventors: Jonathan H. Connell, II, Cortlandt-Manor, NY (US); Myron D. Flickner, San Jose, CA (US); Norman Haas, Mount Kisco, NY (US); Arun Hampapur, Norwalk, CT (US); Sharathchandra U. Pankanti, Norwalk, CT (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 12/052,046

(22) Filed: Mar. 20, 2008

(65) Prior Publication Data
US 2009/0237232 A1  Sep. 24, 2009

(51) Int. Cl.
G08B 19/00 (2006.01)
G08B 29/00 (2006.01)
G01N 31/00 (2006.01)
G06K 15/00 (2006.01)

(52) U.S. Cl. ............. 340/522; 340/692; 340/5.91; 340/5.9; 340/5.92; 705/22; 705/24; 235/383

(58) Field of Classification Search ........... 340/522, 340/692, 5.91, 5.9, 5.92; 705/22, 24; 235/383
See application file for complete search history.

(56) References Cited

U.S. PATENT DOCUMENTS

| 4,323,772 A | 4/1982 | Serge |
| 5,331,455 A | 7/1994 | Chang |
| 5,426,282 A | 6/1995 | Humble |
| 5,467,403 A | 11/1995 | Fishbine et al. |
| 5,477,379 A | 12/1995 | Chang |
| 5,497,314 A | 3/1996 | Novak |

(Continued)

FOREIGN PATENT DOCUMENTS

WO      0225506      3/2002

OTHER PUBLICATIONS

Connell II et al., U.S. Appl. No. 11/756,391, Office Action Communication, Dec. 2, 2009, 19 pages.

(Continued)

Primary Examiner—Donnie L Crosland
(74) Attorney, Agent, or Firm—Anna L. Linne; Hoffman Warnick LLC

(57) ABSTRACT

Under the present invention, a single, overall alarm for an entire set of shopping items will be used for any and all discrepancies. The metric used for creating an alarm for the overall set of shopping items can be based on any one of the following candidate policies: if at least one item generated an alarm; if some fixed number of items generated an alarm; if some threshold discrepancy metric got exceed; if basket size is larger than certain threshold cash value and the alarm exceeded certain threshold alarm rate; a randomly generated alarm (e.g., random audit); the customer's identity and track record (e.g., loyalty card); and/or any combination of the above. Regardless, if an overall alarm is generated one or more of the following actions can be taken: no action send the customer to customer service; appropriately record customer track record (e.g., loyalty card) when customer identity is available; audit the customer at the "shop exit; and/or any combination of thereof.

25 Claims, 4 Drawing Sheets

U.S. PATENT DOCUMENTS

| | | | |
|---|---|---|---|
| 5,513,264 | A | 4/1996 | Wang et al. |
| 5,546,475 | A | 8/1996 | Bolle et al. |
| 5,583,686 | A | 12/1996 | Chen |
| 5,609,223 | A | 3/1997 | Iizaka et al. |
| 5,631,976 | A | 5/1997 | Bolle et al. |
| 5,635,697 | A | 6/1997 | Shellhammer et al. |
| 5,649,970 | A | 7/1997 | Loeb et al. |
| 5,659,167 | A | 8/1997 | Wang et al. |
| 5,763,864 | A | 6/1998 | O'Hagan et al. |
| 5,811,774 | A | 9/1998 | Ju et al. |
| 5,815,200 | A | 9/1998 | Ju et al. |
| 5,883,968 | A | 3/1999 | Welch et al. |
| 5,918,211 | A | 6/1999 | Sloane |
| 6,005,959 | A | 12/1999 | Mohan et al. |
| 6,064,469 | A | 5/2000 | Brownstein |
| 6,122,409 | A | 9/2000 | Boggs et al. |
| 6,287,299 | B1 | 9/2001 | Sasnett et al. |
| 6,310,964 | B1 | 10/2001 | Mohan et al. |
| 6,366,696 | B1 | 4/2002 | Hertz et al. |
| 6,382,357 | B1 | 5/2002 | Morrison et al. |
| 6,434,530 | B1 | 8/2002 | Sloane et al. |
| 6,504,481 | B2 | 1/2003 | Teller |
| 6,556,276 | B2 | 4/2003 | Staeheli et al. |
| 6,606,171 | B1 | 8/2003 | Renk et al. |
| 6,726,094 | B1 | 4/2004 | Rantze et al. |
| 6,853,400 | B1 | 2/2005 | Matama |
| 6,991,158 | B2 | 1/2006 | Munte |
| 7,118,026 | B2 | 10/2006 | Harris et al. |
| 7,124,058 | B2 | 10/2006 | Namaky et al. |
| 7,159,770 | B2 | 1/2007 | Onozu |
| 7,168,618 | B2 | 1/2007 | Schwartz |
| 7,196,624 | B2 | 3/2007 | Teller |
| 7,202,780 | B2 | 4/2007 | Teller |
| 7,334,729 | B2 | 2/2008 | Brewington |
| 7,337,960 | B2 | 3/2008 | Ostrowski et al. |
| 2001/0045463 | A1 | 11/2001 | Madding et al. |
| 2002/0004404 | A1 | 1/2002 | Squibbs |
| 2002/0013837 | A1 | 1/2002 | Battat et al. |
| 2002/0070861 | A1 | 6/2002 | Teller |
| 2002/0110374 | A1 | 8/2002 | Staeheli et al. |
| 2002/0121547 | A1 | 9/2002 | Wieth et al. |
| 2002/0161658 | A1 | 10/2002 | Sussman |
| 2002/0194074 | A1 | 12/2002 | Jacobs |
| 2003/0024982 | A1 | 2/2003 | Bellis, Jr. et al. |
| 2003/0071725 | A1 | 4/2003 | Teller |
| 2003/0167242 | A1 | 9/2003 | Hamilton |
| 2004/0125396 | A1 | 7/2004 | Burke |
| 2005/0096855 | A1 | 5/2005 | Teller |
| 2005/0173527 | A1 | 8/2005 | Conzola |
| 2005/0189411 | A1 | 9/2005 | Ostrowski et al. |
| 2005/0200490 | A1 | 9/2005 | Teller |
| 2005/0211771 | A1 | 9/2005 | Onozu |
| 2005/0237213 | A1 | 10/2005 | Teller |
| 2006/0032915 | A1 | 2/2006 | Schwartz |
| 2006/0047835 | A1 | 3/2006 | Greaux |
| 2006/0161390 | A1 | 7/2006 | Namaky et al. |
| 2006/0179164 | A1 | 8/2006 | Katibian et al. |
| 2006/0288133 | A1 | 12/2006 | Katibian et al. |
| 2006/0290980 | A1 | 12/2006 | Terada |
| 2007/0107016 | A1 | 5/2007 | Angel et al. |
| 2007/0107017 | A1 | 5/2007 | Angel et al. |
| 2007/0107021 | A1 | 5/2007 | Angel et al. |
| 2007/0279244 | A1 | 12/2007 | Haughawout et al. |
| 2008/0027796 | A1 | 1/2008 | Chaves |
| 2008/0059281 | A1 | 3/2008 | Tower et al. |
| 2008/0141755 | A1 | 6/2008 | Edwards |
| 2008/0142598 | A1 | 6/2008 | Kwan |
| 2008/0149725 | A1 | 6/2008 | Rosenbaum |
| 2009/0119168 | A1 | 5/2009 | Otto et al. |

OTHER PUBLICATIONS

Connell II et al., U.S. Appl. No. 12/052,051, Office Action Communication, Feb. 23, 2009, 13 pages.

Connell II et al., U.S. Appl. No. 12/052,051, Office Action Communication, Jan. 6, 2010, 24 pages.

Connell II et al., U.S. Appl. No. 12/052,051, Office Action Communication, Sep. 8, 2009, 19 pages.

Connell II et al., U.S. Appl. No. 12/052,051, Office Action Communication, Jun. 26, 2009, 19 pages.

Connell II et al., U.S. Appl. No. 11/782,177, Office Action Communication, Nov. 24, 2009, 16 pages.

Connell II et al., U.S. Appl. No. 11/782,173, Office Action Communication, Nov. 27, 2009, 12 pages.

Connell II et al., U.S. Appl. No. 11/782,173, Office Action Communication, May 27, 2009, 12 pages.

Sahai, "Towards Distributed and Dynamic Network Management", IEEE, 1998, 10 pages.

Reesen, "Virtual World Technolgies to Manage a Grid", IBM Corporation, 2008, 19 pages.

Derwent, Web based ordering system for non-standardised goods e.g. fruit, vegetables provides view of item for selection and prints bar code on item for order processing, Jul. 10, 1998, Abstract, 2 pages.

Bolle, "Veggie Vision: A Produce Recognition System", Produce Marketing Association, 8 pages.

Connell, "Item Scanning System", 24 pages.

Bolle, "Veggie Vision: A Produce Recognition System", WACV 1996, 4 pages.

Connell II, U.S. Appl. No. 12/052,051, Office Action Communication, Jun. 11, 2010, 32 pages.

Hai, U.S. Appl. No. 12/037,270, Office Action Communication, Aug. 6, 2010, 19 pages.

Connell II, et al., U.S. Appl. No. 11/782,177, Final Office Action, Apr. 23, 2010, 18 pages.

Connell II, et al., U.S. Appl. No. 11/782,173, Examiner's Answer, Apr. 30, 2010, 11 pages.

Connell II, et al., U.S. Appl. No. 11/756,391, Final Office Action, May 6, 2010, 18 pages.

Kim, U.S. Appl. No. 11/756,382, Office Action Communication, Sep. 29, 2010, 26 pages.

Stanford, U.S. Appl. No. 12/112,318, Office Action Communication, Nov. 8, 2010, 20 pages.

ALARM SOLUTION FOR SECURING SHOPPING CHECKOUT

CROSS-REFERENCE TO RELATED APPLICATIONS

This application is related in some aspects to the commonly owned and co-pending application entitled "Secure Checkout System," filed Jul. 24, 2007, and which is assigned U.S. patent application Ser. No. 11/782,177, the entire contents of which are herein incorporated by reference. This application is related in some aspects to the commonly owned and co-pending application entitled "Smart Scanning System," filed May 31, 2007, and which is assigned U.S. patent application Ser. No. 11/756,391, the entire contents of which are herein incorporated by reference. This application is also related in some aspects to the commonly owned and co-pending application entitled "Portable Device-Based Shopping Checkout," filed May 31, 2007, and which is assigned U.S. patent application Ser. No. 11/756,382, the entire contents of which are herein incorporated by reference.

FIELD OF THE INVENTION

Aspects of the present invention generally relate to an alarm solution for shopping checkout. Specifically, an embodiment of the present invention relates to a system in which an overall alarm methodology is utilized for an entire set of shopping items, as opposed to potential multiple alarms for individual shopping items.

BACKGROUND OF THE INVENTION

Marketplace security has become a rising concern over recent years. Security and anti-theft concerns have only increased with the pervasiveness of scanners at checkout stations. It has become increasingly frequent for perpetrators to switch and/or alter barcodes so that an item can be obtained for a cheaper price. In addition, many retailers also utilize cameras to catch shop lifters.

Ticket switching refers to situations where the barcode scanned by the checker/clerk (at the point of sale/checkout) into the system is different from the actual barcode of the item. The barcode scanned may be different from the actual barcode of the item being purchased for several reasons: (i) the shopper may have tampered with the actual barcode tagged on to the shopping item; (ii) the checker may be scanning a barcode (e.g., on her wrist) other than what is tagged to the product. Note that in a checkout involving a cashier, this situation may represent the classic case of "sweet hearting", i.e., the shopper and the cashier collude to commit the ticket switching fraud; and/or (iii) there may be multiple barcodes inadvertently attached to the shopping item. Note that the ticket switching can happen in both cashier-based checkout as well as self-checkout. Currently, alarms are generated whenever an individual discrepancy is monitored. For a large set of items, this could cause many alarms to be generated. This causes an increased need for store attention, and slows down shopper checkout throughput.

In view of the foregoing, there exits a need for a solution that solves at least one of the above-referenced deficiencies in the related art.

SUMMARY OF THE INVENTION

The present invention provides an alarm solution for shopping checkout. Specifically, under the present invention, a single, overall alarm for an entire set of shopping items will be used for any and all discrepancies. The metric used for creating an alarm for the overall set of shopping items can be based on any one of the following candidate policies: if at least one item generated an alarm; if some fixed number of items generated an alarm; if some threshold discrepancy metric got exceeded; if basket size is larger than certain threshold cash value and the alarm exceeded certain threshold alarm rate; a randomly generated alarm (e.g., random audit); the customer's identity and track record (e.g., loyalty card); and/or any combination of the above. Regardless, if an overall alarm is generated one or more of the following actions can be taken: no action send the customer to customer service; appropriately record customer track record (e.g., loyalty card) when customer identity is available; audit the customer at the "shop exit; and/or any combination of thereof.

A first aspect of the present invention provides a method for securing shopping checkout, comprising: processing a set of shopping items pursuant to a shopping checkout; and generating a single overall alarm for the set of shopping items if at least one of a set of alarm criteria occurred during the shopping checkout.

A second aspect of the present invention provides a system for securing shopping checkout, comprising: a module processing a set of shopping items pursuant to a shopping checkout; and a module for generating a single overall alarm for the set of shopping items in its entirety if at least one of a set of alarm criteria occurred during the shopping check out.

A third aspect of the present invention provides a program product stored on a computer readable medium for securing shopping checkout, the computer readable medium comprising program code for causing a computer system to: process a set of shopping items pursuant to a shopping checkout; and generate a single overall alarm for the set of shopping items in its entirety if at least one of a set of alarm criteria occurred during the shopping checkout.

A fourth aspect of the present invention provides a method for deploying an application for securing shopping checkout, comprising: providing a computer infrastructure being operable to: process a set of shopping items pursuant to a shopping checkout; and generate a single overall alarm for the set of shopping items in its entirety if at least one of a set of alarm criteria occurred during the shopping checkout.

A fifth aspect of the present invention provides a data processing system for securing shopping checkout, comprising: a memory medium having instructions; a bus coupled to the memory medium; and a processor coupled to the bus that when executing the instructions causes the data processing system to: process a set of shopping items pursuant to a shopping checkout, and generate a single overall alarm for the set of shopping items in its entirety if at least one of a set of alarm criteria occurred during the shopping checkout.

BRIEF DESCRIPTION OF THE DRAWINGS

These and other features of this invention will be more readily understood from the following detailed description of the various aspects of the invention taken in conjunction with the accompanying drawings in which.

Figure 1:
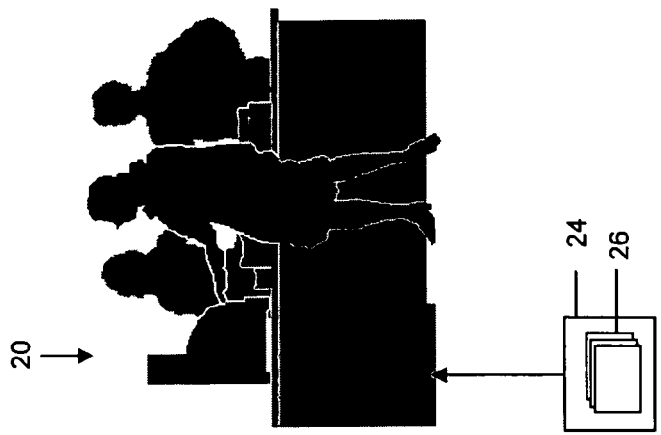
FIG. 1 depicts an illustrative system for secure checkout according to an embodiment of the present invention.
Figure 1:
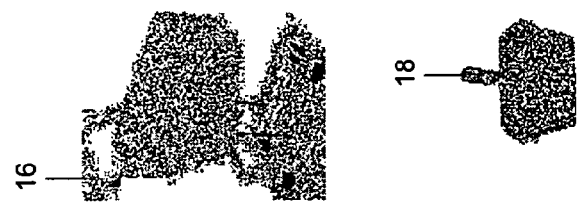
Figure 1:
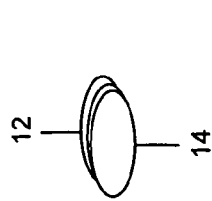

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following Sections:
I. General Description
II. Computerized Implementation I. General Description The present invention provides an alarm solution for shopping checkout. Specifically, under the present invention, a single, overall alarm for an entire set of shopping items will be used for any and all discrepancies. The metric used for creating an alarm for the overall set of shopping items can be based on any one of the following candidate criteria/policies: if at least one item generated an alarm; if some fixed number of items generated an alarm; if some threshold discrepancy metric got exceeded; if basket size is larger than certain threshold cash value and the alarm exceeded certain threshold alarm rate; a randomly generated alarm (e.g., random audit); the customer's identity and track record (e.g., loyalty card); and/or any combination of the above. Regardless, if an overall alarm is generated one or more of the following actions can be taken: no action send the customer to customer service; appropriately record customer track record (e.g., loyalty card) when customer identity is available; audit the customer at the "shop exit; and/or any combination of thereof.

Referring now to FIG. 1, secure checkout system 10 according to an embodiment of the present invention is shown. In general, secure checkout system 10 comprises a checkout station 20 (e.g., a self-checkout station or an employee-based checkout station), and alarm program 24 having a set (at least one) of program modules 26. Alarm program 24 can incorporate or work in conjunction with any checkout station software now known or later developed.

Figure 2:
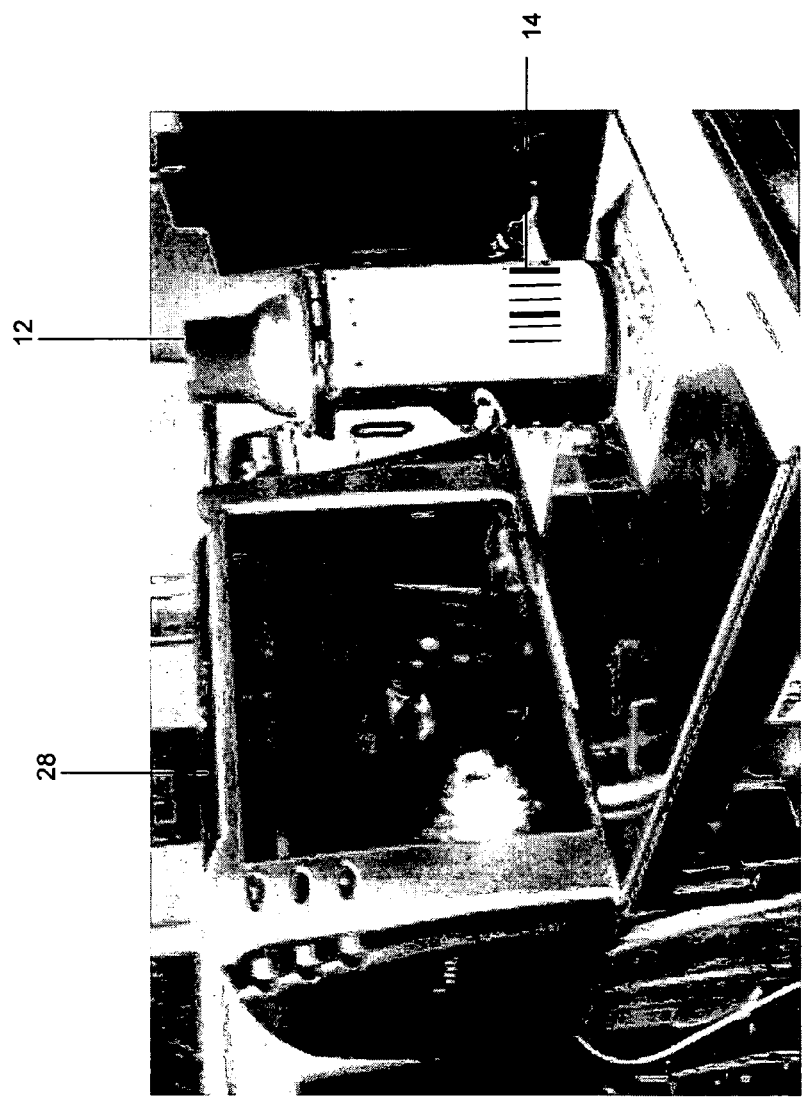
FIG. 2 depicts an illustrative scanner according to an embodiment of the present invention.
Figure 3:
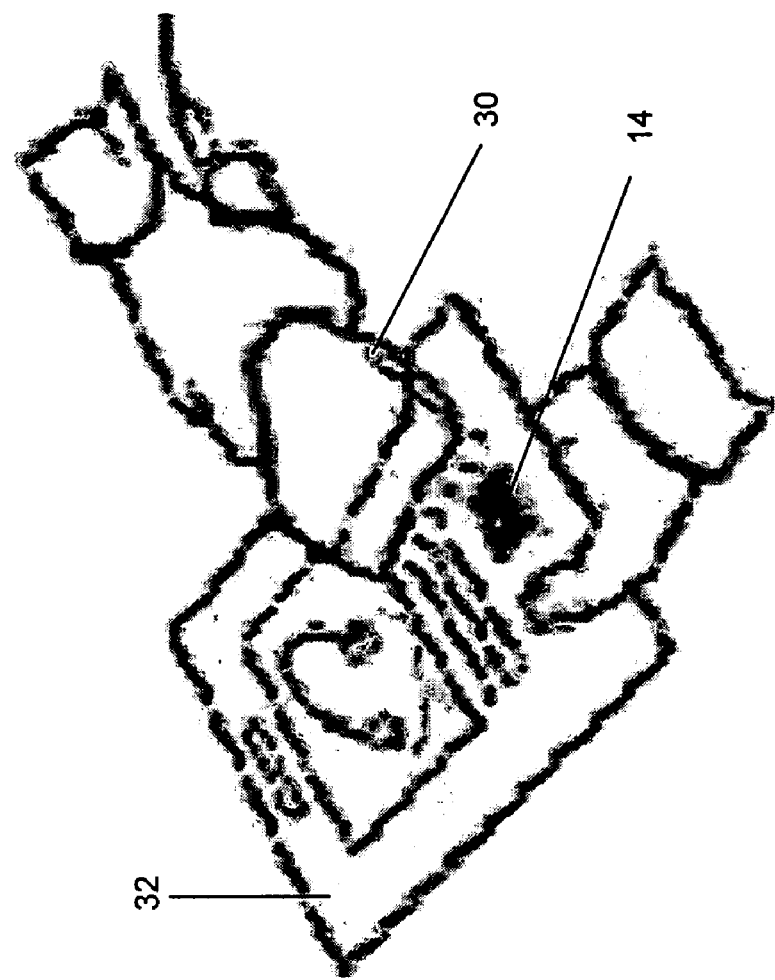
FIG. 3 depicts an illustrative scanner according to another embodiment of the present invention.

The functions of secure checkout system 10 will now be explained in greater detail. Specifically, as is well known, as a shopper shops, he/she may place one or more items 12 into a shopping receptacle such as a cart 16 or basket 18. When the shopper reaches a checkout station 20, the barcode 14 of items 12 will be scanned as part of the checkout process. Under the present invention, the scanning can be accomplished using any type of scanner now known or later developed. For example, the scanner could be a fixed checkout station scanner 28 as shown in FIG. 2, and/or a handheld scanner 30 as shown in FIG. 3. Handheld scanner 30 is typically used for large, heavy or "pass-around" items, or for scanning a barcode 14 separate from item 12 such as that present in an advertisement 32. Regardless, the present invention is designed to reduce or eliminate any loss that may come from label tampering or confusion. When a scan of a barcode 14 of an item 12 is received, secure checkout system 10 (e.g., by executing alarm program 24) will determine an identity of item 12. This occurs via known means such as cross-referencing a table of barcode values to product identities.

Under previous embodiments, every discrepancy occurring during the scanning processes resulted in a separate "alarm" or notification to store personnel. Such discrepancies could exist if a barcode was damaged, unrecognized, etc. Each alarm requires a separate and distinct intervention by store personnel.

In an illustrated embodiment, a computer/register system executing alarm program 24. Alarm program is configured so that only a single, overall alarm occurs for an entire set (one or more) of shopping items. Thus, multiple alarms should not occur for the same set of shopping items. To this extent, alarm program can implement one or more of the following criteria/policies: if at least one item generated an alarm; if some fixed number of items generated an alarm; if some threshold discrepancy metric got exceed; if basket size is larger than certain threshold cash value and the alarm exceeded certain threshold alarm rate; a randomly generated alarm (e.g., random audit); the customer's identity and track record (e.g., loyalty card); and/or any combination of the above. Regardless, if an overall alarm is generated one or more of the following actions can be taken: no action send the customer to customer service; appropriately record customer track record (e.g., loyalty card) when customer identity is available; audit the customer at the "shop exit; and/or any combination thereof".

II. Computerized Implementation

Figure 4:
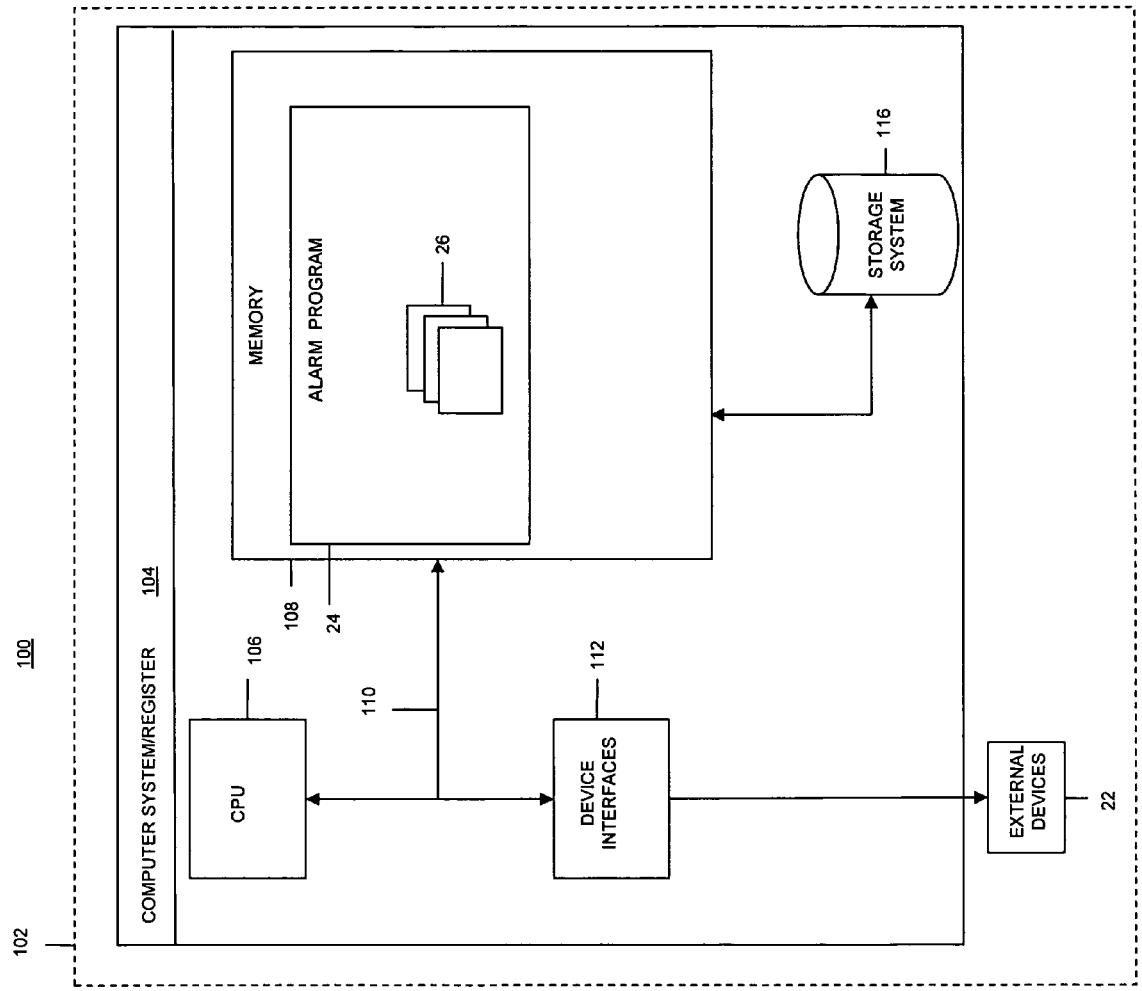
FIG. 4 depicts a more specific computerized implementation according to an embodiment of the present invention.

Referring now to FIG. 4, a computerized implementation 100 of an embodiment of the present invention is shown. As depicted, implementation 100 includes computer system/register 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, computer system/register 104 includes a processing unit 106, a memory 108, a bus 110, and device interfaces 112. Further, computer system/register 104 is shown external devices 114 and storage system 116 that communicate with bus via device interfaces. In general, processing unit 106 executes computer program code, such as alarm program 24, which are stored in memory 108 and/or storage system 116. While executing computer program code, processing unit 106 can read and/or write data to/from memory 108, storage system 116, and/or device interfaces 112. Bus 110 provides a communication link between each of the components in computer system/register 104. Although not shown, computer system/register 104 could also include I/O interfaces that communicate with: one or more external devices such as a cash register, a keyboard, a pointing device, a display, etc.; one or more devices that enable a user to interact with computer system/register 104; and/or any devices (e.g., network card, modem, etc.) that enable computer system/register 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various processes of the invention. Moreover, computer system/register 104 is only representative of various possible computer systems that can include numerous combinations of hardware. To this extent, in other embodiments, computer system/register 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external device 114. Still further, it is understood that one or more additional components (e.g., system software, math co-processing unit, etc.) not shown in FIG. 4 can be included in computer system/register 104.

Storage system 116 can be any type of system capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system/register 104.

Shown in memory 108 of computer system/register 104 is alarm program 24, which includes a set (at least one) of modules 26. The modules generally provide the functions of the present invention as described herein. For example (among other things), set of modules 26 is configured to: process a set of shopping items pursuant to a shopping checkout; generate a single overall alarm for the set of shopping items if at least one of a set of alarm criteria (described above) occurred during the shopping checkout; and take at least one action (described above) if the overall alarm is generated.

While shown and described herein as a secure checkout system, method, and program item, it is understood that the invention further provides various alternative embodiments. For example, in one embodiment, the invention provides a computer-readable/useable medium that includes computer program code to enable a computer infrastructure to provide secure checkout. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 4) and/or storage system 116 (FIG. 4) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide secure checkout. In this case, the service provider can create, maintain, and support, etc., a computer infrastructure, such as computer infrastructure 102 (FIG. 4) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for secure checkout. In this case, a computer infrastructure, such as computer infrastructure 102 (FIG. 4), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system/register 104 (FIG. 4), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or processing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for securing shopping checkout, comprising:
   processing a set of shopping items pursuant to a shopping checkout, the set of shopping items being an entirety of shopping items for a single customer; and
   generating only one single overall alarm for the set of shopping items if at least one of a set of alarm criteria occurred during the shopping checkout regardless of a total number of alarm criteria that occurred during the shopping checkout.

2. The method of claim 1, wherein the generating is in response to an indication that the processing has completed.

3. The method of claim 1, the set of alarm criteria including if some fixed quantity of the set of items generated an alarm.

4. The method of claim 1, the set of alarm criteria including if a threshold discrepancy metric got exceed.

5. The method of claim 1, the set of alarm criteria including a random generation of an alarm that is unrelated to the set of shopping items.

6. The method of claim 1, the set of alarm criteria including a history pertaining to a customer associated with the set of shopping items that is unrelated to the set of shopping items themselves.

7. The method of claim 1, further comprising taking at least one action if the overall alarm is generated.

8. The method of claim 7, the at least one action being selected from a group consisting of: a referral to customer service, a logging of events, and audit of set of shopping items.

9. A system for securing shopping checkout, comprising:
   a module processing a set of shopping items pursuant to a shopping checkout, the set of shopping items being an entirety of shopping items for a single customer; and
   a module for generating only one single overall alarm for the set of shopping items in its entirety if at least one of a set of alarm criteria occurred during the shopping check out regardless of a total number of alarm criteria that occurred during the shopping checkout.

10. The system of claim 9, the set of alarm criteria including if at least one of the set of items generated an alarm.

11. The system of claim 9, the set of alarm criteria including if some fixed quantity of the set of items generated an alarm.

12. The system of claim 9, the set of alarm criteria including if a threshold discrepancy metric got exceed.

13. The system of claim 9, the set of alarm criteria including a random generation of an alarm that is unrelated to the set of shopping items.

14. The system of claim 9, the set of alarm criteria including a history pertaining to a customer associated with the set of shopping items that is unrelated to the set of shopping items themselves.

15. The system of claim 9, further comprising a module for taking at least one action if the overall alarm is generated.

16. The system of claim 15, the at least one action being selected from a group consisting of: a referral to customer service, a logging of events, and audit of set of shopping items.

17. A computer program product loaded into the internal memory of a computer for securing shopping checkout, the computer readable program code configured to:
   process a set of shopping items pursuant to a shopping checkout, the set of shopping items being an entirety of shopping items for a single customer; and
   generate only one single overall alarm for the set of shopping items in its entirety if at least one of a set of alarm criteria occurred during the shopping checkout regardless of a total number of alarm criteria that occurred during the shopping checkout.

18. The program product of claim 17, the set of alarm criteria including if at least one of the entire set of items generated an alarm.

19. The program product of claim 17, the set of alarm criteria including if some fixed quantity of the entire set of items generated an alarm.

20. The program product of claim 17, the set of alarm criteria including if a threshold discrepancy metric got exceed.

21. The program product of claim 17, the set of alarm criteria including a random generation of an alarm that is unrelated to the set of shopping items.

22. The program product of claim 17, the set of alarm criteria including a history pertaining to a customer associated with the entire set of shopping items that is unrelated to the set of shopping items themselves.

23. The program product of claim 17, further comprising taking at least one action if the overall alarm is generated.

24. The program product of claim 23, the at least one action being selected from a group consisting of: a referral to customer service, a logging of events, and audit of set of shopping items.

25. A method for deploying an application for securing shopping checkout, comprising:
   providing a computer infrastructure being operable to:
      process a set of shopping items pursuant to a shopping checkout, the set of shopping items being an entirety of shopping items for a single customer; and
      generate only one single overall alarm for the set of shopping items in its entirety if at least one of a set of alarm criteria occurred during the shopping checkout regardless of a total number of alarm criteria that occurred during the shopping checkout.

* * * * *